United States Patent
Venkataraman et al.

(10) Patent No.: US 10,096,840 B1
(45) Date of Patent: Oct. 9, 2018

(54) HIGH TEMPERATURE AIR PURGE OF SOLID OXIDE FUEL CELL ANODE ELECTRODES

(71) Applicant: BLOOM ENERGY CORPORATION, Sunnyvale, CA (US)

(72) Inventors: Swaminathan Venkataraman, Cupertino, CA (US); Emad El Batawi, Sunnyvale, CA (US); Matthias Gottmann, Sunnyvale, CA (US); Tad Armstrong, Burlingame, CA (US); Manoj Pillai, Sunnyvale, CA (US); Padiadpu Shankara Anantha, Mumbai (IN); Vijay Radhakrishnan, Mumbai (IN); Mohamed Sharif, Mumbai (IN); Pradhiba Mohan, Mumbai (IN); Rakesh Kandiboina, Mumbai (IN)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 206 days.

(21) Appl. No.: 14/968,194

(22) Filed: Dec. 14, 2015

Related U.S. Application Data

(60) Provisional application No. 62/091,821, filed on Dec. 15, 2014.

(51) Int. Cl.
| | | |
|---|---|---|
| *H01M 8/24* | (2016.01) | |
| *H01M 8/1246* | (2016.01) | |
| *H01M 8/04228* | (2016.01) | |
| *H01M 8/04* | (2016.01) | |
| *H01M 8/06* | (2016.01) | |
| *H01M 8/12* | (2016.01) | |
| *H01M 4/90* | (2006.01) | |
| *H01M 8/04223* | (2016.01) | |
| *H01M 8/0662* | (2016.01) | |
| *H01M 8/124* | (2016.01) | |

(52) U.S. Cl.
CPC ..... *H01M 4/9033* (2013.01); *H01M 8/04228* (2016.02); *H01M 8/04231* (2013.01); *H01M 8/0662* (2013.01); *H01M 8/1246* (2013.01); *H01M 8/24* (2013.01); *H01M 2008/1293* (2013.01); *H01M 2300/0071* (2013.01)

(58) Field of Classification Search
None
See application file for complete search history.

(56) References Cited

U.S. PATENT DOCUMENTS

| | | |
|---|---|---|
| 4,898,792 A | 2/1990 | Singh et al. |
| 4,917,971 A | 4/1990 | Farooque |
| | (Continued) | |

OTHER PUBLICATIONS

Fouquet et al., kinetics and oxidation and reduction of Ni/YSZ cermets, Jan. 2003, 9, 103-108.*

(Continued)

*Primary Examiner* — Daniel S Gatewood
(74) *Attorney, Agent, or Firm* — The Marbury Law Group PLLC

(57) ABSTRACT

A method of operating a solid oxide fuel cell (SOFC) system which contains a plurality of SOFCs having cermet anode electrodes includes operating the SOFC system above 760° C. to generate electricity and intentionally oxidizing the cermet anode electrodes at a temperature of at least 760° C. when the SOFC system stops operating to generate electricity.

13 Claims, 13 Drawing Sheets

(56) References Cited

U.S. PATENT DOCUMENTS

| | | |
|---|---|---|
| 4,983,471 A | 1/1991 | Reichner et al. |
| 5,034,287 A | 7/1991 | Kunz |
| 5,047,299 A | 9/1991 | Shackling |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |
| 5,498,487 A | 3/1996 | Ruka et al. |
| 5,527,631 A | 6/1996 | Singh et al. |
| 5,601,937 A | 2/1997 | Isenberg |
| 5,733,675 A | 3/1998 | Dederer et al. |
| 5,733,682 A | 3/1998 | Quadakkers et al. |
| 5,741,605 A | 4/1998 | Gillett et al. |
| 5,942,349 A | 8/1999 | Badwal et al. |
| 6,013,385 A | 1/2000 | DuBose |
| 6,051,125 A | 4/2000 | Pham et al. |
| 6,280,865 B1 | 8/2001 | Eisman et al. |
| 6,329,090 B1 | 12/2001 | McElroy et al. |
| 6,403,245 B1 | 6/2002 | Hunt |
| 6,436,562 B1 | 8/2002 | DuBose |
| 6,854,688 B2 | 2/2005 | McElroy et al. |
| 7,390,456 B2 | 6/2008 | Glatz et al. |
| 7,514,166 B2 * | 4/2009 | Hickey ............. H01M 4/8621 429/411 |
| 7,705,490 B2 | 4/2010 | Srinivasan et al. |
| 7,713,649 B2 | 5/2010 | Hickey et al. |
| 8,173,063 B2 | 5/2012 | Zobl et al. |
| 8,440,362 B2 | 5/2013 | Richards et al. |
| 8,652,691 B1 | 2/2014 | Perry et al. |
| 2001/0044041 A1 | 11/2001 | Badding et al. |
| 2002/0058175 A1 | 5/2002 | Ruhl |
| 2005/0053812 A1 | 3/2005 | Hickey et al. |
| 2005/0164051 A1* | 7/2005 | Venkataraman ....... B01J 8/0257 429/410 |
| 2006/0096453 A1 | 5/2006 | Meacham |

OTHER PUBLICATIONS

Austin, G, Cell and Stack Construction: low-Temperature Cells, I.G. Austin, NASA SP-120, 1967.

Milliken-et al., Low Cost, High Efficiency Reversible Fuel Cell Systems, Proceedings of the 2002 U.S. Doe Hydrogen, Program Review, NREUCP-610-32405.

Ruhl, et al., Low Cost Reversible Fuel Cell System, Proceedings of the 2000 U.S. DOE Hydrogen Program Review, Jun. 15, 2000, NREUCP-570-28890.

Technology Management, Low Cost, Compact Solid Oxide Fuel Cell Generator, NASA Small Business Innovation Research Program.

Advanced Technology, Small, Ultra Efficient Fuel Cell Systems, Advanced Technology Program ATP 2001 Competition (2002).

Proceedings 2001, Low Cost, High Efficiency Reversible Fuel Cell (and Electrolyzer) Systems, Proceedings of the 2001 DOE Hydrogen Program Review NREUCP-570-30535.

Mitlitsky, et al., Regenerative Fuel Cells for High Altitude Long Endurance Solar Powered Aircraft, F. Mitlitsky, et al, 28 Intersociety Energy Conversion Engineering Conference (IECEC), Jul. 28, 1993, UCRL-JC-113485.

Mitlitsky, et al., Unitized Regenerative Fuel Cells for Solar Rechargeable Aircraft and Zero Emission Vehicles, 1994 Fuel Cell Seminar, Sep. 6, 1994, UCRL-JC-117130.

Eguchi, et al., Power Generation and Steam Electrolysis Characteristics of an Electrochemical Cell with a Zirconia- or Ceria-based Electrode, Solid State Ionics, 86 88 (1996) 1245-1249.

* cited by examiner

HIGH TEMPERATURE AIR PURGE OF SOLID OXIDE FUEL CELL ANODE ELECTRODES

FIELD

The embodiments of the present invention are generally directed to solid oxide fuel cell systems and their operation, and specifically to intentional high temperature oxidation of solid oxide fuel cell anode electrodes in particular.

BACKGROUND OF THE INVENTION

Fuel cells are electrochemical devices which can convert energy stored in fuels to electrical energy with high efficiencies. In a high temperature fuel cell system, such as a solid oxide fuel cell (SOFC) system, an oxidizing flow is passed through the cathode side of the fuel cell, while a fuel flow is passed through the anode side of the fuel cell. The oxidizing flow is typically air, while the fuel flow can be a hydrocarbon fuel, such as methane, natural gas, propane, ethanol, or methanol. The fuel cell, operating at a typical temperature between 750° C. and 950° C., enables combination of the oxygen and free hydrogen, leaving surplus electrons behind. The excess electrons are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through openings or holes in the supporting layer of each fuel cell, such as the electrolyte layer, and gas separator of each cell. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

SUMMARY

One embodiment provides a method of operating a solid oxide fuel cell (SOFC) system which contains a plurality of SOFCs having cermet anode electrodes includes operating the SOFC system above 760° C. to generate electricity and intentionally oxidizing the cermet anode electrodes at a temperature of at least 760° C. when the SOFC system stops operating to generate electricity.

Another embodiment provides a method of restoring electrical conductivity of a solid oxide fuel cell having a cermet anode electrode, comprising re-oxidizing the anode electrode at a temperature above 760° C., and re-reducing the anode electrode after re-oxidizing the anode electrode at the temperature above 760° C.

Another embodiment provides a solid oxide fuel cell (SOFC) system, comprising a plurality of SOFCs having cermet anode electrodes, and an oxidation unit which is configured to intentionally oxidize the cermet anode electrodes at a temperature of at least 760° C. when the SOFC system stops operating to generate electricity.

Another embodiment provides a solid oxide fuel cell (SOFC) system, comprising a plurality of SOFCs having cermet anode electrodes, and a oxidation means for intentionally oxidizing the cermet anode electrodes at a temperature of at least 760° C. when the SOFC system stops operating to generate electricity.

DETAILED DESCRIPTION OF THE EMBODIMENTS

The accompanying drawings, which are incorporated herein and constitute part of this specification, illustrate example embodiments of the invention, and together with the general description given above and the detailed description given below, serve to explain the features of the invention.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates.

Figure 1:
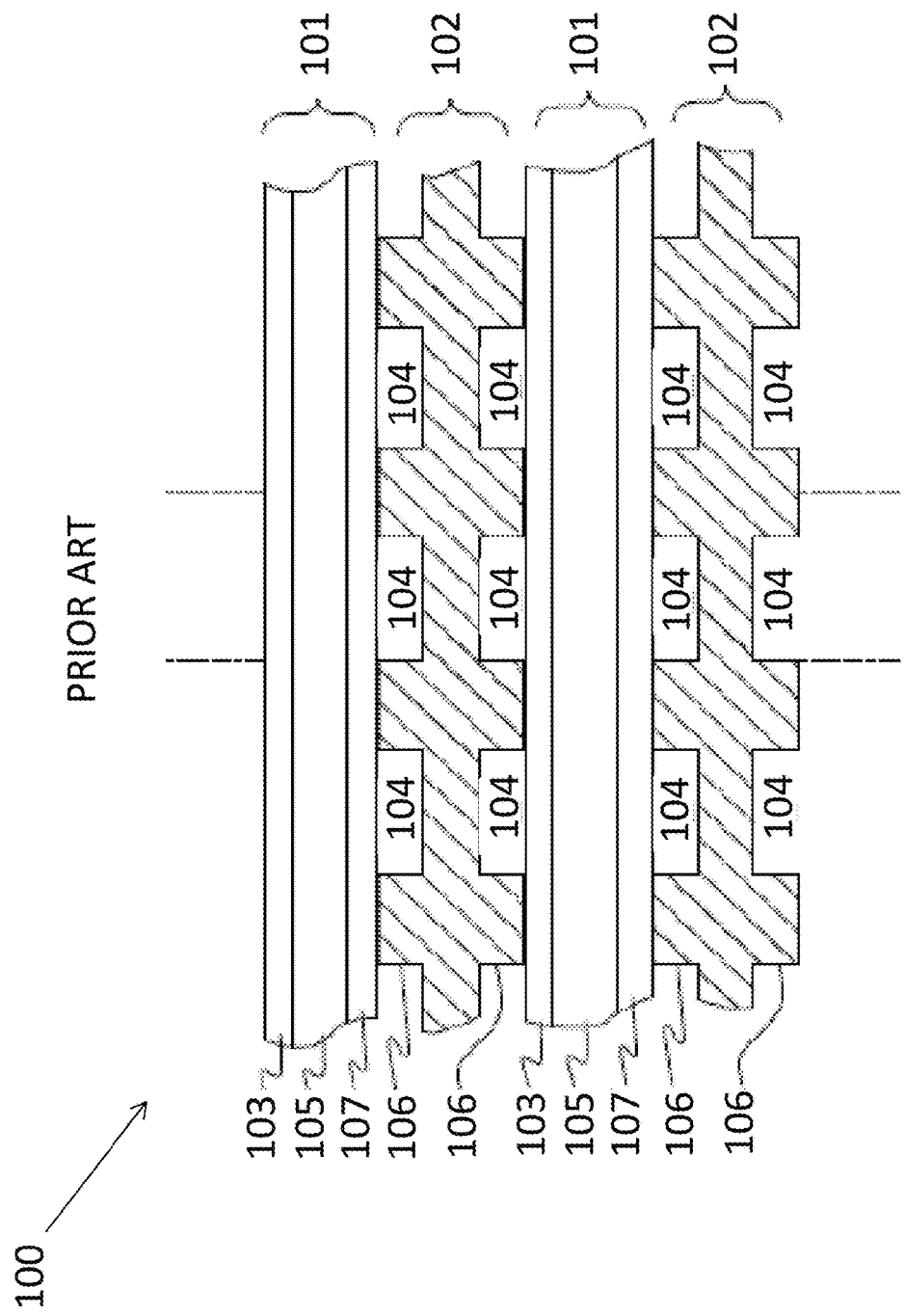
FIG. 1 is a schematic side cross-sectional view of an exemplary SOFC stack.

FIG. 1 is a side cross-sectional view of an exemplary SOFC stack 100. In the SOFC stack 100, each SOFC 101 comprises an anode electrode 103, a solid oxide electrolyte 105, and a cathode electrode 107 located on an opposite side of the electrolyte from the anode electrode. Fuel cell stacks are frequently built from a multiplicity of SOFC's 101 in the form of planar elements, tubes, or other geometries. Fuel and air has to be provided to the electrochemically active surface, which can be large.

The gas flow separator 102 (referred to as a gas flow separator plate when part of a planar stack), containing gas flow passages or channels 104 between ribs 106, separates the individual cells in the stack. The gas flow separator plate separates fuel, such as a hydrocarbon fuel, flowing to the fuel electrode (i.e. anode 103) of one cell in the stack from oxidant, such as air, flowing to the air electrode (i.e. cathode 107) of an adjacent cell in the stack. At either end of the stack, there may be an air end plate or fuel end plate (not shown) for providing air or fuel, respectively, to the end electrode.

Frequently, the gas flow separator plate 102 is also used as an interconnect which electrically connects the anode or fuel electrode 103 of one cell to the cathode or air electrode 107 of the adjacent cell. In this case, the gas flow separator plate which functions as the interconnect is made of or contains electrically conductive material. FIG. 1 shows that the lower SOFC 101 is located between two interconnects 102.

SOFC anode electrodes 103 are usually fabricated from a nickel based ceramic-metal (cermet) mixtures. The cermet mixtures include nickel—doped ceria (e.g., samaria doped ceria), nickel—stabilized zirconia (e.g., scandia or yttria stabilized zirconia), nickel—doped ceria and stabilized zirconia, etc. cermets, such as the cermets described in U.S. Pat. Nos. 8,748,056 and 8,617,763 and U.S. Published Application Number US 2008-0254336 A1, incorporated herein by reference in their entirety. For proper SOFC operation, the metallic component of these anodes 103 is kept reduced. When the metallic component oxidizes (i.e., is converted from a metal to a metal oxide), the electrical conductivity of the anode 103 drops by several orders of magnitude and the anode 103 must be re-reduced (i.e., converted back to a metal by an anneal in a reducing ambient or by electrochemical reduction) to properly operate. Many anodes 103 are unable to withstand oxidation-reduction cycles at all because they delaminate from the electrolyte during the cycles due to the volume changes of its constituents. Although carefully engineered cermets may at least partially avoid a significant volume change during the oxidation and reduction cycles, and thereby provide a degree of oxidation-reduction cycling capability, they nonetheless may experience significant permanent performance degradation after the oxidation-reduction cycle.

An important operating challenge for SOFC systems are "emergency stops" in which the SOFC system is suddenly shut down (i.e., stops generating electricity) and is left to cool down without active control or intervention. An emergency stop may be caused by a number of factors, such as a failure of a system component (e.g., a failure of an air and/or fuel blower or pump, failure of fuel piping, failure of stack components, etc.), interruption in the supply of fuel or air to the system, failure or disconnection of an electrical load, activation of an emergency shutdown in case of an environmental emergency (e.g., earthquake, tornado, hurricane, etc.) or electrical overload, etc. The emergency stop may be intentionally activated by the system computer controller or by a human operator in response to a system condition (e.g., component failure, disruption of fuel or air supply, etc.) or the emergency stop may occur unintentionally due to an unforeseen event. During an emergency stop, anode oxidation occurs at relatively low temperatures as air slowly enters the anode side of each fuel cell by diffusion along the fuel plumbing (e.g., from the fuel inlet or outlet conduits after fuel flow to the system is stopped during the emergency stop) while stack temperatures slowly decay due to conductive and natural convection heat loss.

The present inventors realized that the low-temperature anode oxidation may lead to fuel cell performance degradation that cannot be cured by subsequent re-reduction of the anode. Without wishing to be bound by a particular theory, the present inventors believe that the fuel cell performance degradation may occur by a mechanism which is schematically illustrated in FIGS. 2A-2D.

Figure 2A:
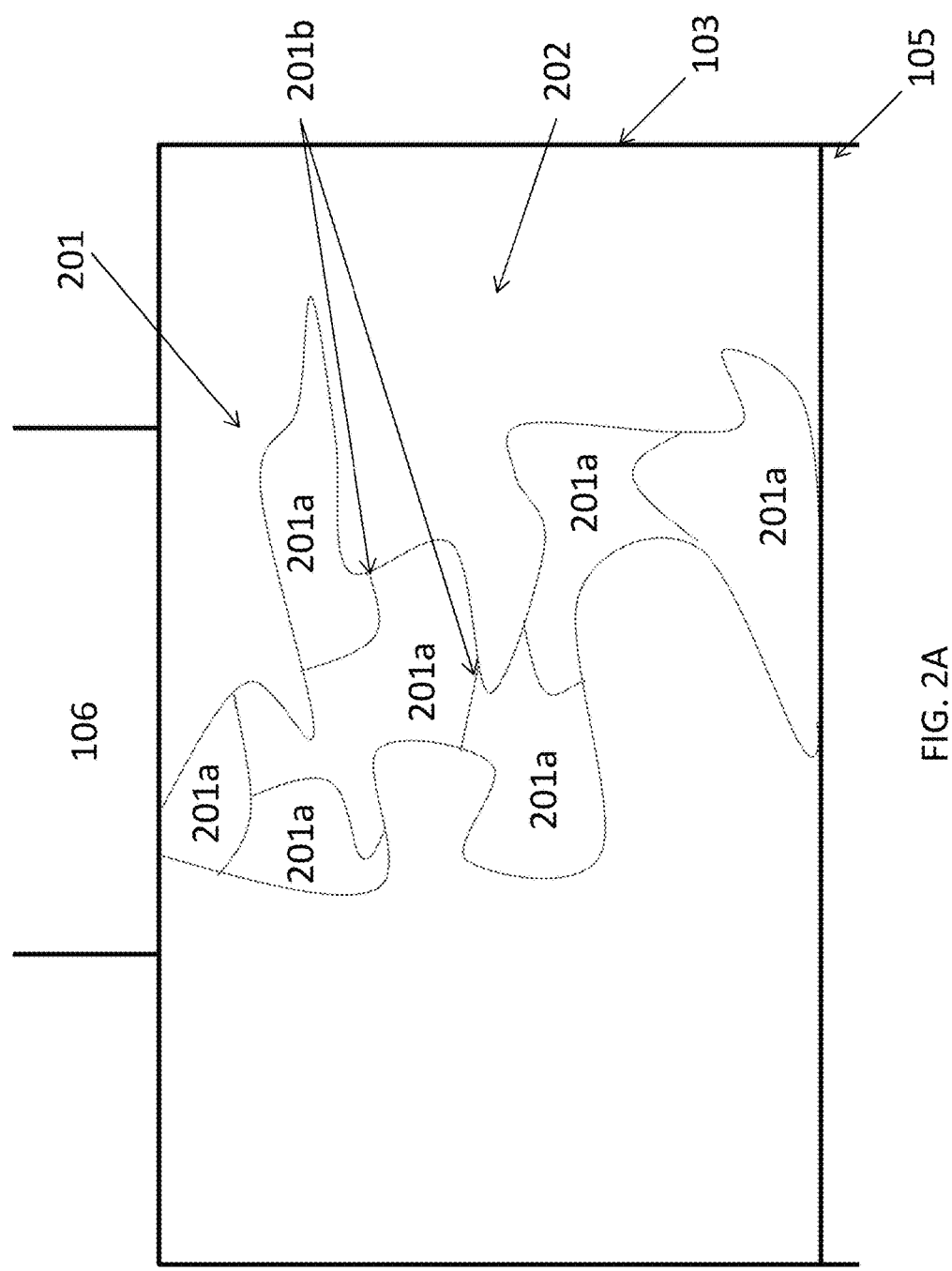
FIG. 2A is a schematic side cross-sectional view of a SOFC anode and its composition before oxidation.

FIG. 2A is a schematic side cross-sectional view of a SOFC anode 103 and its microstructure before oxidation. A rib 106 of the adjacent interconnect 102 in the stack is shown in contact with one side of the anode 103 and the electrolyte 105 is in contact with the opposite side of the anode 103. The anode 103 contains one or more metallic phase regions 201, such as nickel phase regions (only one region 201 is shown for clarity) in the ceramic matrix 202. The regions 201 are believed to form a percolating conductive nickel network through the thickness of the anode 103 from the ribs 106 to the electrolyte 105. While only one anode 103 layer is shown for clarity, it should be understood that the anode 103 may have plural sublayers of different composition and/or porosity, as described in U.S. Pat. No. 8,748,056. Without wishing to be bound by a particular theory, it is believed that each metallic phase region 201 is a polycrystalline metal or metal alloy region, such as a nickel region, which contains a plurality of grains 201a separated by grain boundaries 201b.

Figure 2B:
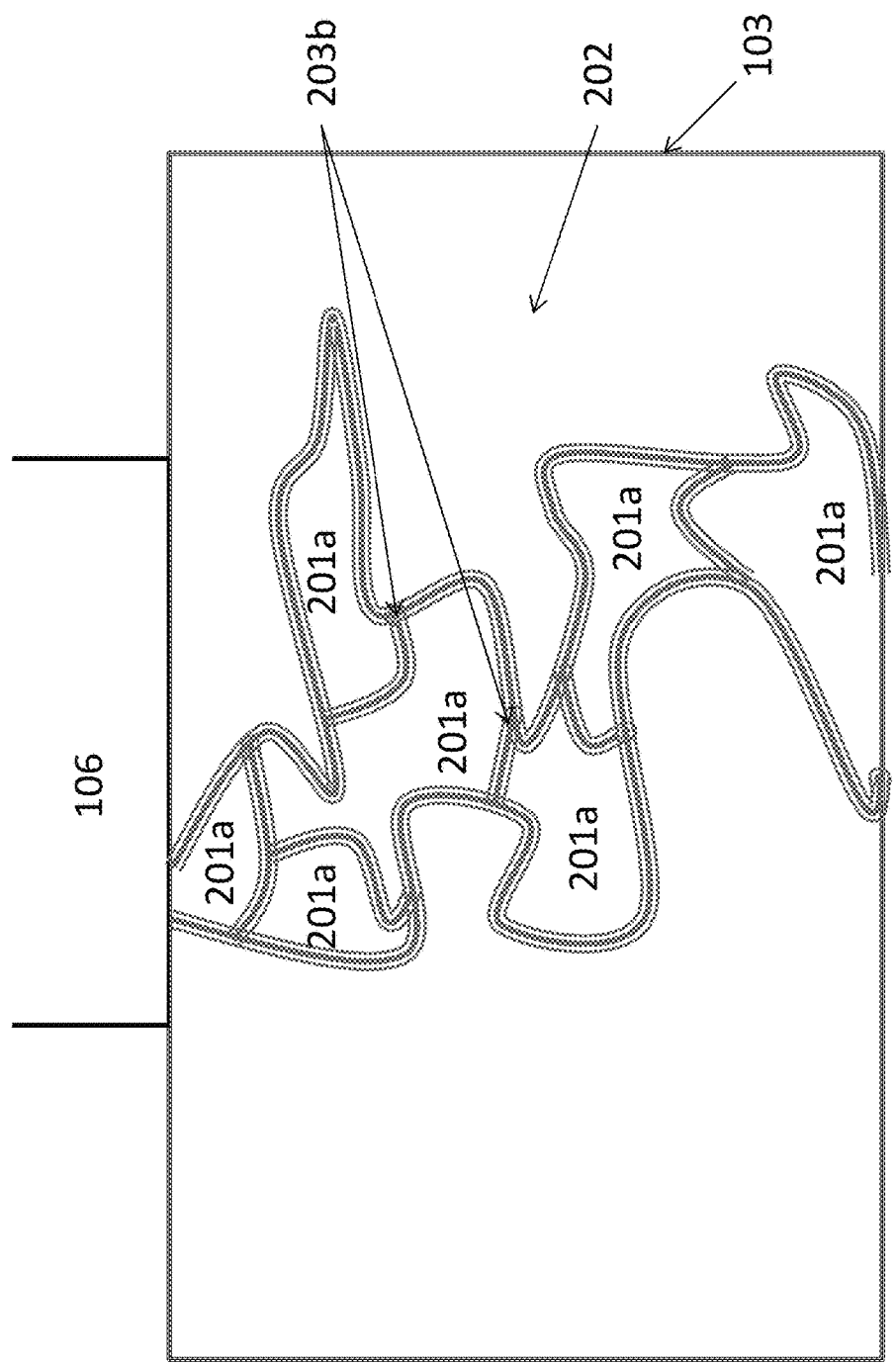
FIGS. 2B and 2C are schematic side cross-sectional views of a SOFC anode and its composition during and following oxidation, respectively, at relatively low temperatures.

FIG. 2B is a schematic side cross-sectional view of a SOFC anode 103 and its microstructure, during oxidation relatively low temperatures, such as below 750° C. When a SOFC anode 103 is oxidized, the metallic phase (e.g., nickel) regions 201 in the cermet are converted into nickel oxide regions 203 in the ceramic matrix 202 of the anode 103. Without wishing to be bound by a particular theory, it is believed that when the oxidation takes place at relatively low temperatures, such as between room temperature and 700° C., the nickel oxidation is initiated preferentially at the grain boundaries 201b. Thus, the grain boundaries 201b are converted to nickel oxide regions 203b which separate discrete nickel grains 201a.

Figure 2C:
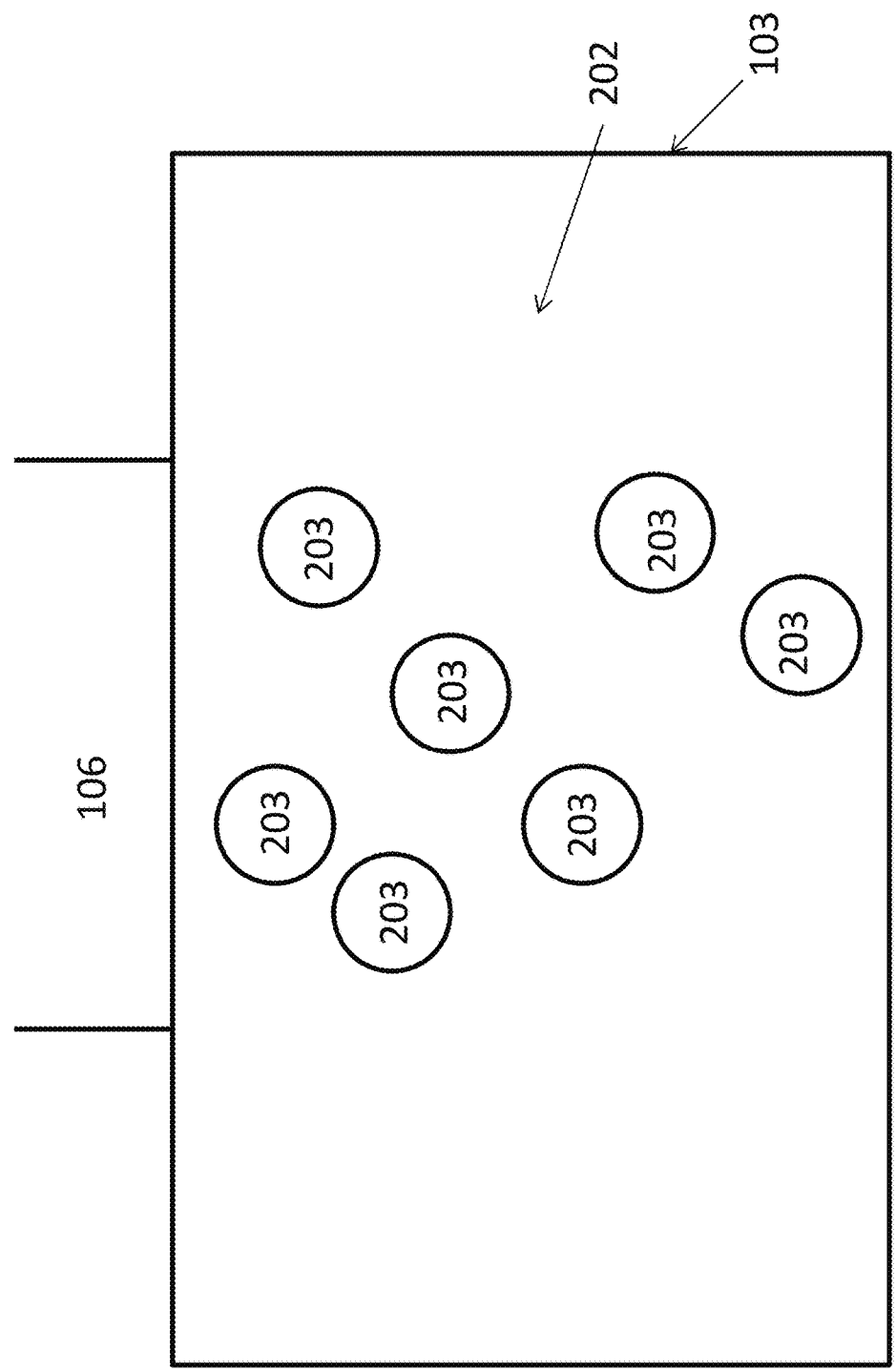

FIG. 2C is a schematic side cross-sectional view of a SOFC anode 103 and its microstructure, after completion of oxidation at relatively low temperatures. As shown in this figure, the discrete nickel grains 201a are oxidized to form a plurality of small, discrete nickel oxide regions 203, which are shown schematically as discrete circles or ovals, in a ceramic (e.g., doped scandia and/or stabilized zirconia) matrix 202. Alternatively, if the oxidation is not complete, then some of the discrete nickel grains 201a may remain in the ceramic matrix 202. Thus, it is believed that discrete, relatively small sized nickel oxide regions 203 are formed in the ceramic matrix 202 during low temperature oxidation.

Figure 2D:
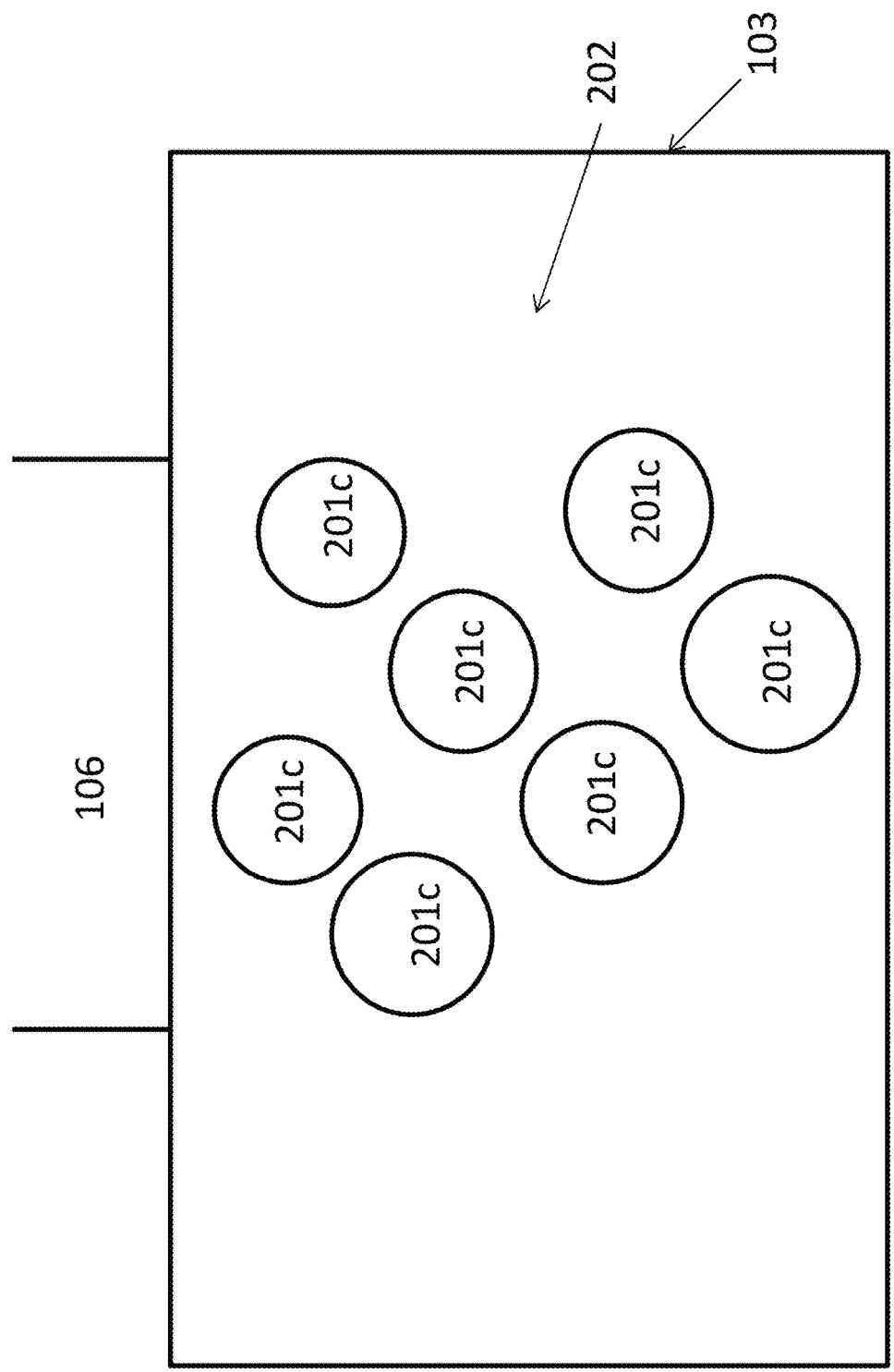
FIG. 2D is schematic side cross-sectional view of a SOFC anode and its composition after re-reduction following the oxidation at relatively low temperatures.

FIG. 2D is schematic side cross-sectional view of the SOFC anode 103 after re-reduction following the oxidation at relatively low temperatures. When the anode 103 is re-reduced following low-temperature oxidation, the discrete nickel oxide regions 203 of FIG. 2C are converted back into nickel regions 201c. However, the resulting nickel regions are believed to be shaped as larger, discrete nickel clumps 201c which are located in place of the nickel oxide regions 203 in the ceramic matrix 202.

It is believed that the nickel clumps 201c either do not form a percolating network which provides electrical conductivity between the interconnect ribs 206 and the electrolyte 205 or form the percolating network to a lesser degree than the network shown in FIG. 2A which existed prior to the oxidation step. In other words, the nickel clumps 201c exhibit a lower percolation (e.g., the nickel clumps 201c may be discrete and spaced apart from each other), thereby minimizing the possible number of nickel network paths that an electron can follow through the anode 103.

Thus, it is believed that the low temperature oxidation leads to higher electrical resistance within the anode 103. In other words, the low temperature oxidation is believed to cause the anode 103 cermet in FIG. 2D to have a lower electrical conductivity after the re-reduction than the anode 103 cermet in FIG. 2A prior to the initial low temperature oxidation.

The present inventors have found that the degree to which anodes lose performance in an oxidation-reduction cycle depends upon the temperature of the oxidation step in the cycle. For example, when an oxidation step is executed at relatively high temperature, such as near the SOFC operating temperature, such as at a temperature of 760° C. and above, such as 760 to 1100° C., including 800 to 950° C., the electrical performance of the anode 103 and its electrical conductivity suffer no reduction or only minimal reduction compared to the low temperature oxidation.

Thus, an embodiment provides intentionally oxidizing SOFC anode electrodes 103 in a SOFC stack 100 at a relatively high temperature, such as at 760° C. and above, in case of a stoppage, such as an emergency stop or a pre-planned stop of the SOFC system, to prevent the low temperature oxidation of the anode electrodes 103. The high temperature oxidation may be followed by a reduction of the anode electrodes (e.g., electrochemical reduction or reduction by annealing in a reducing ambient, such as a hydrogen or forming gas containing ambient) prior to or during restart of the electricity generating operation of the SOFC stack 100.

Figure 3A:
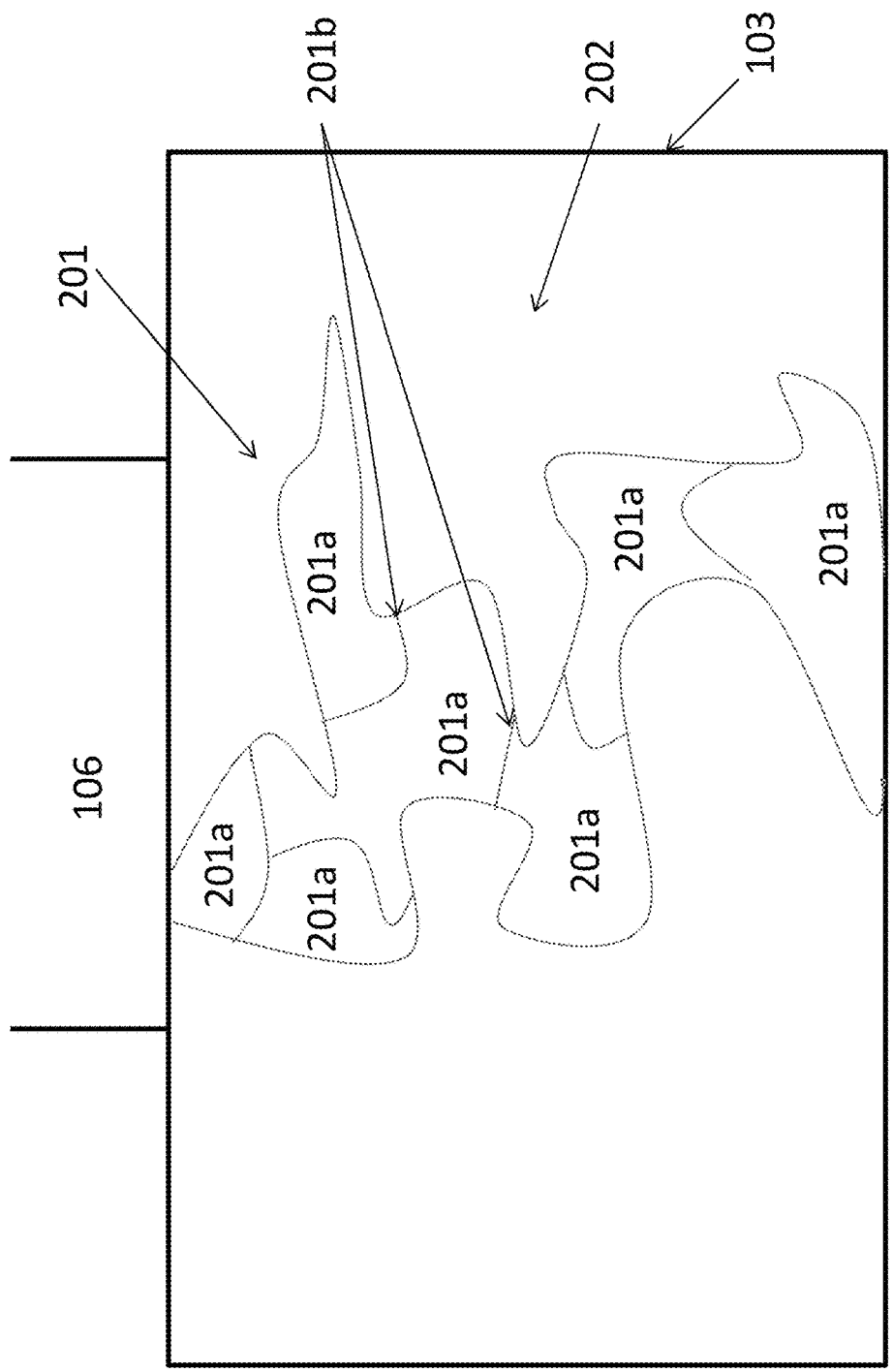
FIG. 3A is a schematic side cross-sectional view of a SOFC anode and its composition before oxidation.
Figure 3B:
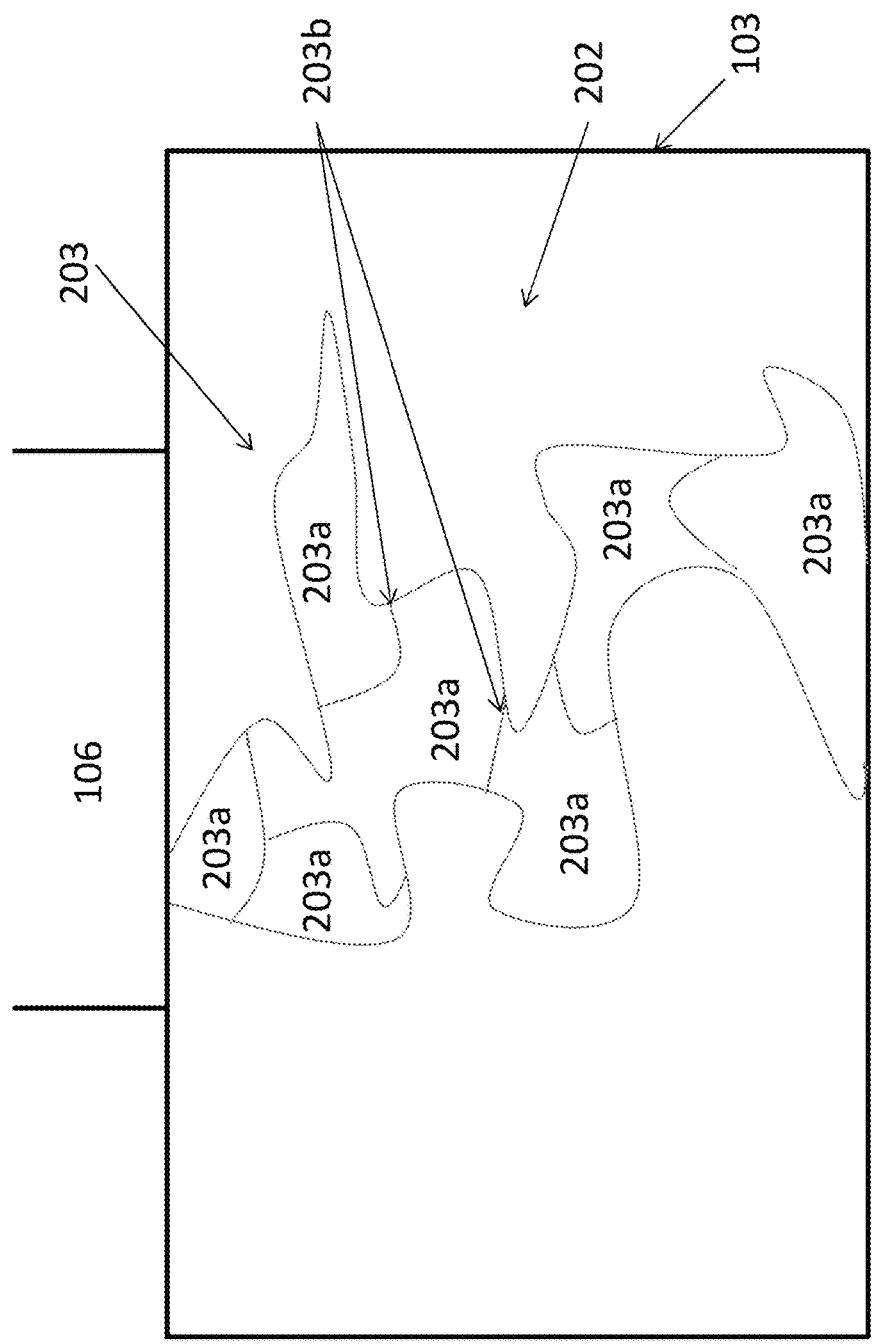
FIG. 3B is a schematic side cross-sectional view of a SOFC anode and its composition after oxidation near SOFC operating temperature.
Figure 3C:
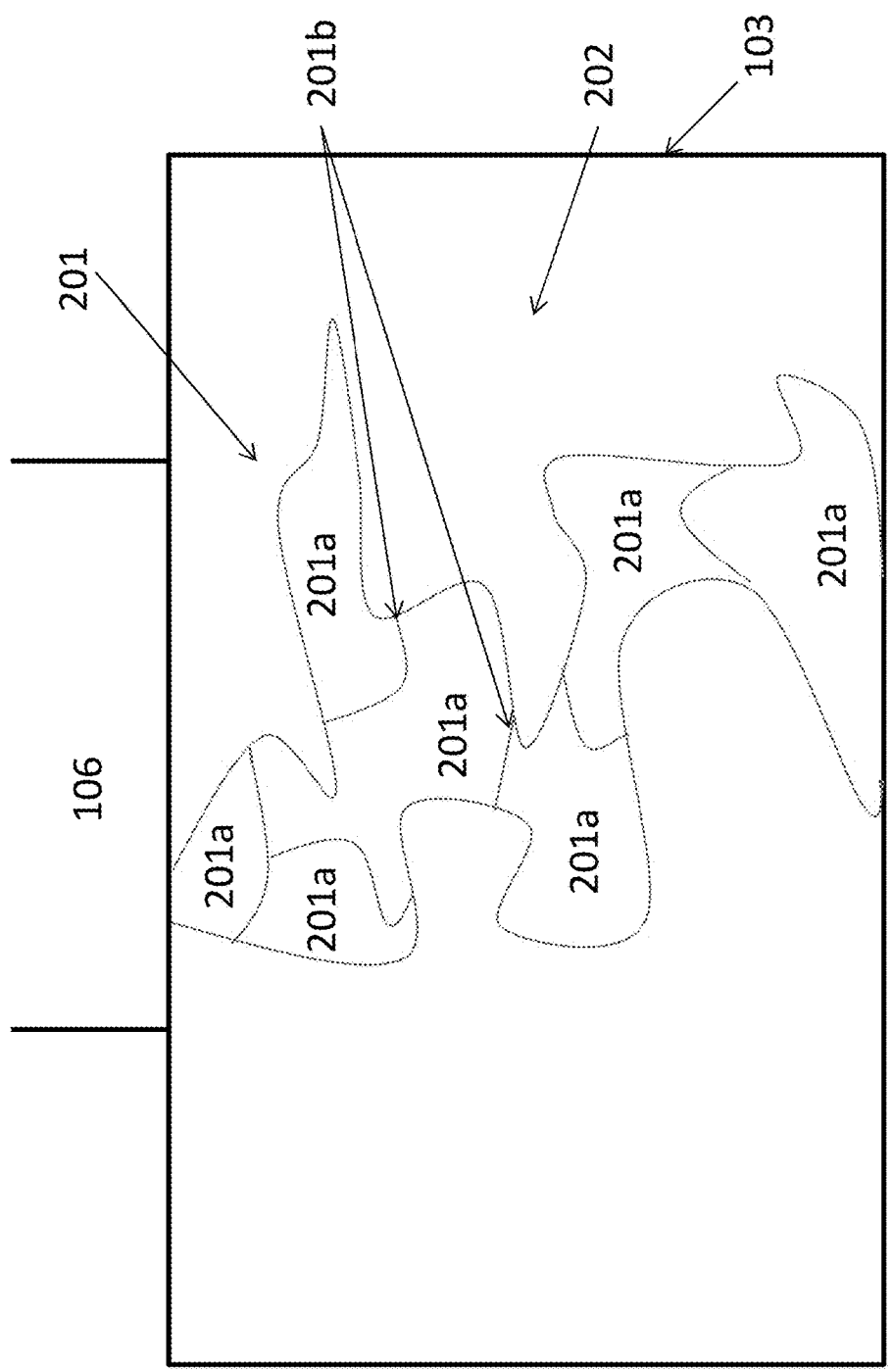
FIG. 3C is schematic side cross-sectional view of a SOFC anode and its composition after re-reduction following oxidation near SOFC operating temperature.

Without wishing to be bound by a particular theory, the present inventors believe that the high temperature oxidation may avoid or reduce the degradation of the anode 103 by a mechanism which is schematically illustrated in FIGS. 3A-3C.

FIG. 3A is a schematic side cross-sectional view of a SOFC anode 103 and its microstructure before oxidation. FIG. 3A is the same as FIG. 2A.

FIG. 3B is a schematic side cross-sectional view of a SOFC anode 103 and its microstructure after the high temperature, such as at 760° C. and above, oxidation. Without wishing to be bound by a particular theory, it is believed that at higher temperatures, the oxidation of nickel regions 201 occurs relatively uniformly throughout the regions 201, rather than preferentially at the grain boundaries 201b. Thus, both the nickel grains 201a and the grain boundaries 201b in the nickel regions 201 are oxidized to nickel oxide at about the same rate. This results in a relatively continuous nickel oxide percolating network 203, which may contain nickel oxide grains 203a and grain boundaries 203b in a ceramic matrix 202.

After the reduction step shown in FIG. 3C, the continuous nickel oxide percolating network 203, including the nickel oxide grains 203a and grain boundaries 203b is converted back to the continuous nickel percolating network 201, which may contain nickel grains 201a and grain boundaries 201b. Thus, the nickel percolating network is re-established after the high temperature oxidation—reduction cycle with minimal or no loss in anode 103 electrical conductivity. While one non-limiting possible mechanism is described above, it should be understood that other possible mechanisms may also be responsible for the effect instead of or in addition to the above described mechanism.

Furthermore, the present inventors discovered that a high temperature (e.g., 760° C. and above) oxidation followed by a reduction step can actually heal and reverse the conductivity decrease caused by a low temperature oxidation and reduction cycle. Thus, another embodiment provides intentionally oxidizing SOFC anode electrodes 103 in a SOFC stack 100 at a relatively high temperature, such as at 760° C. and above, in case the anode electrodes previously suffered a low temperature oxidation, to heal or repair at least some of the electrical conductivity decrease caused by the low temperature oxidation. The intentional oxidation of the SOFC anode electrodes 103 at the relatively high temperature may follow a complete low temperature oxidation—reduction cycle, and may be followed by a re-reduction of the anode prior to or during restart of the electricity generating operation of the SOFC stack 100.

Figure 4A:
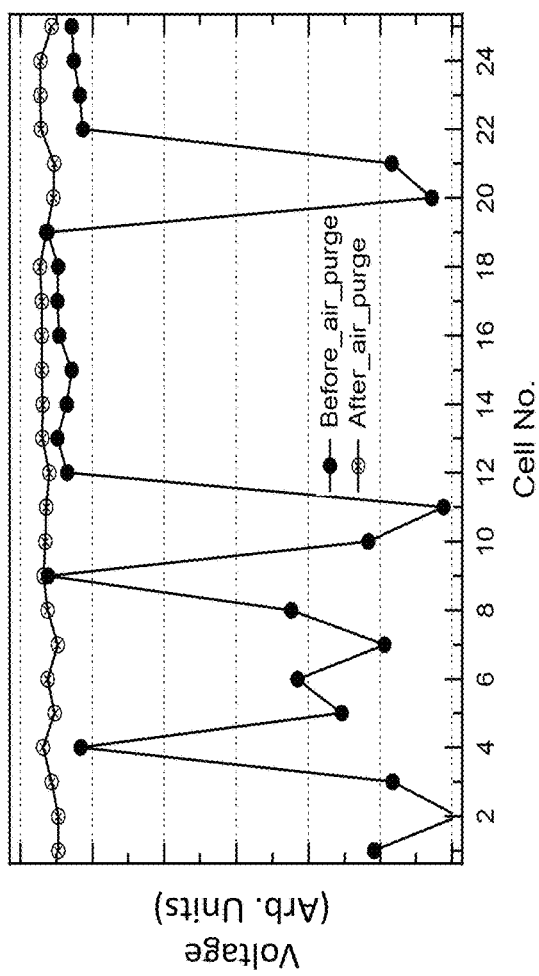
FIG. 4A is a plot illustrating the output voltage of each SOFC cell in a stack after low temperature oxidation followed by re-reduction of the anodes and after high temperature oxidation followed by re-reduction of the anodes.
Figure 4B:
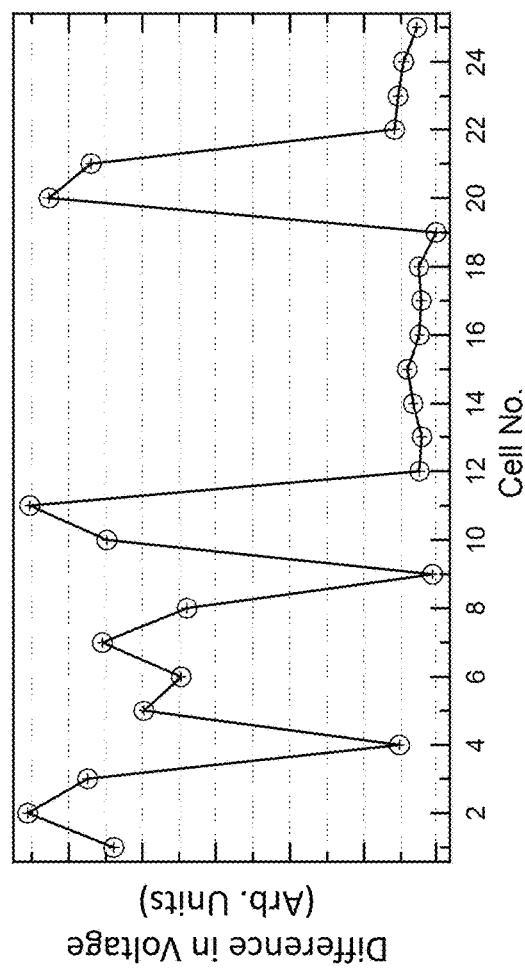
FIG. 4B is a plot illustrating the difference in the output voltage of the SOFC cells after the low temperature oxidation followed by re-reduction and after high temperature oxidation followed by re-reduction.
Figure 4C:
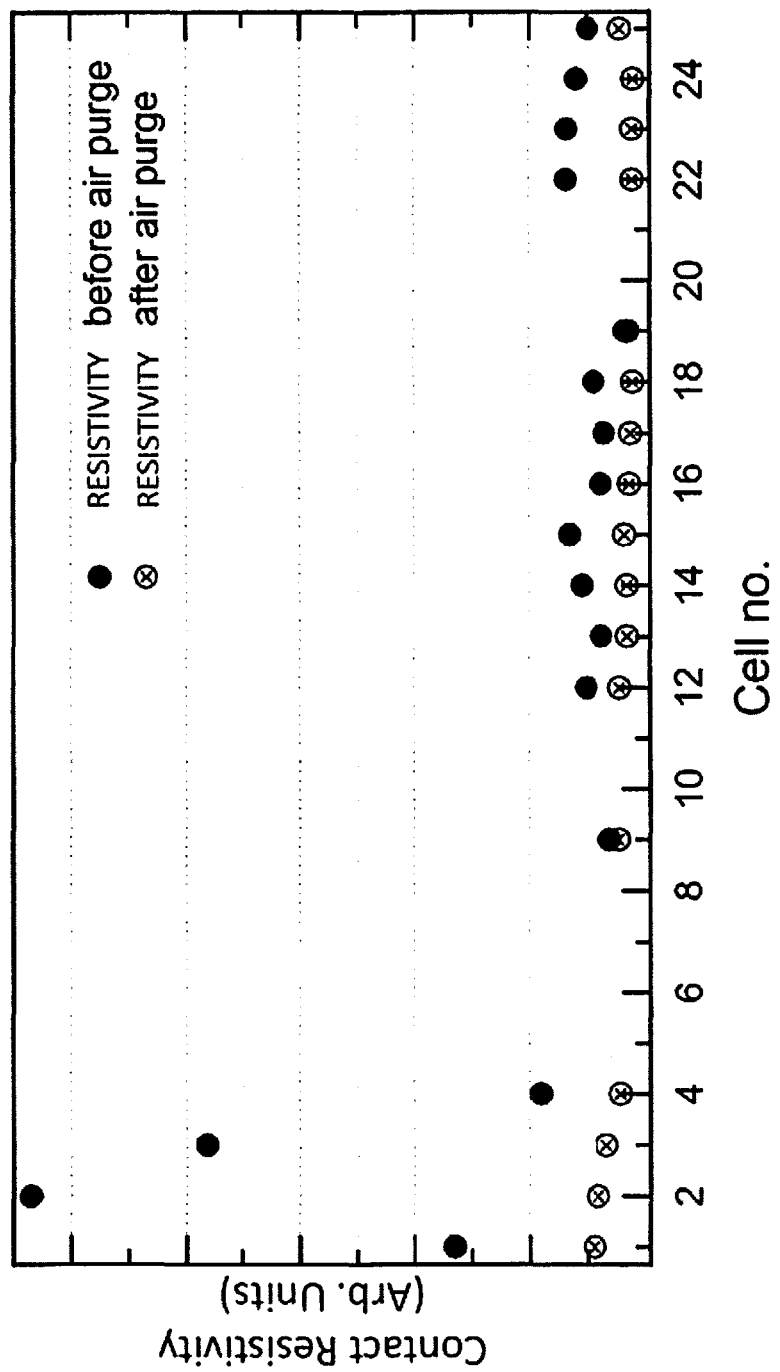
FIG. 4C is a plot illustrating the contact resistivity SOFC cells in a stack after low temperature oxidation followed by re-reduction of the anodes and after high temperature oxidation followed by re-reduction of the anodes.

The advantage of controlled high (e.g., operating or near operating) temperature oxidation is demonstrated in FIGS. 4A-4C. Stack level experiments were conducted on field returned stacks to understand how oxidation cycles impact stack performance in a system in service. In a test station, system level operating conditions (e.g., thermal history, current, flows, etc.) were simulated to assess the performance of the stack before and after the oxidation.

FIG. 4A is a plot of voltage versus cell number illustrating the cell performance of SOFC cells in a 25 cell test stack after lower temperature oxidation (e.g., below 760° C.) followed by re-reduction (closed circles) and after a subsequent higher (e.g., at or below 760° C.) temperature oxidation followed by re-reduction (open circles).

Specifically, the anodes of the 25 cells in the stack were oxidized with a low-temperature air purge and then re-reduced. The voltage of each cell was then measured and the data shown as closed (i.e., filled) circles. As can be seen, the low temperature oxidation followed by re-reduction resulted in a significant difference in performance (i.e., voltage output) of the cells in the stack. Specifically, cells 1-3, 5-8, 10-11, 20 and 21 suffered a significant degradation in performance (i.e., a decrease in voltage and DC power output) compared to the remaining cells in the stack.

Next, the same 25 cells in the stack were oxidized with high temperature air purge and re-reduced. The voltage of each cell was then measured and the data shown as open (i.e., unfilled) circles in FIG. 4A. FIG. 4B is a plot of a change (i.e., difference) in output voltage of the cells after the low temperature oxidation followed by re-reduction and the high temperature oxidation followed by the re-reduction (i.e., a difference in voltage between the open circle and the closed circle for each of the 25 cells in FIG. 4A).

As can be seen from FIGS. 4A and 4B, the high temperature oxidation followed by re-reduction resulted in a significant improvement in performance (i.e., an increase in voltage and DC power output) of all cells 1-3, 5-8, 10-11, 20 and 21 which previously suffered a significant degradation in performance after the low temperature oxidation and re-reduction. The high temperature oxidation followed by re-reduction also resulted in a slight improvement or no change in performance of the remaining cells in the stack that did not suffer the significant degradation in performance after the low temperature oxidation and re-reduction (i.e., there was no negative effect on performance of any cell in the stack due to the high temperature oxidation and re-reduction). Furthermore, the performance (i.e., output voltage) of all 25 cells in the stack was fairly similar (e.g., within 10% of each other) after the high temperature oxidation and re-reduction. Thus, the high temperature oxidation followed by re-reduction actually healed the cells whose performance was degraded after the low temperature oxidation and re-reduction.

Without wishing to be bound by a particular theory, it is believed that the high temperature oxidation and re-reduction restored the electrical conductivity of the anodes whose performance was degraded by the low temperature oxidation and re-reduction, such as by the mechanism described above with reference to FIGS. 3A-3C and/or by another mechanism. Specifically, it is believed that the high temperature oxidation and re-reduction resulted in a reduction in contact resistivity due to re-distribution of the metallic phase to restore the conductive percolation network in the cermet anodes.

FIG. 4C is a plot illustrating the contact resistivity of SOFC cells in a stack after low temperature oxidation followed by re-reduction of the anodes, and after high temperature oxidation followed by re-reduction of the anodes based on electrochemical impedance spectroscopy measurement. FIG. 4C shows the contact resistivity of SOFC cells in a 25 cell test stack after lower temperature oxidation followed by re-reduction (closed circles) and after a subsequent higher (e.g., above 760° C.) temperature oxidation followed by re-reduction (open circles with "X"). The data for cells 5-8, 10-11 and 20-21 was very noisy because of low cell performance and thus excluded from the plot for clarity. As shown in FIG. 4C, a number of cells (e.g., 1-4) suffered a significant increase in contact resistivity after the low temperature oxidation followed by the re-reduction. However, the contact resistivity of these cells was restored to a lower value similar to that of other cells in the stack after the high temperature oxidation followed by re-reduction.

In general, the high temperature oxidation followed by re-reduction either reduced the contact resistivity of each cell or did not change it, even after the contact resistivity of the cells was degraded by an initial low temperature oxidation. As demonstrated by FIG. 4C, in addition to maintaining low electrical contact resistivity, high temperature oxidation also healed cells previously degraded by the low temperature oxidation.

In an embodiment, the intentional, controlled high temperature oxidation is performed by providing an oxidizing agent, such as air (e.g., an air purge) to the anodes 103 of the stack 100 through the fuel inlet and/or outlet conduits at or near SOFC operating temperature (i.e., the high temperature of at least 760° C.). Thus, the air purge is preferably conducted as soon as possible after the stop of the SOFC system, such as within five minutes of the emergency stop. While air is the preferred oxidizing agent, other oxidizing agents, such as oxygen gas, water vapor, etc. may be used instead of or in addition to the air purge.

In one embodiment, the air purge of the anodes 103 in the stack 100 is triggered automatically in case of the stoppage of the electricity generation by the system, such as an intentional (i.e., pre-planned) or an emergency stop of the system. An intentional stop of the system may occur to service or replace system components or due to a planned disconnection of the electrical load from the system. In another embodiment, if after the stoppage of the system, the measured temperature of the SOFC stack 100 approaches 760° C. (e.g., if the temperature reaches a threshold above 760° C., such as 775° C.) and the SOFC system is not restarted at this time, then the air purge is initiated by the system controller (e.g., control unit 150 shown in FIGS. 5-7).

Figure 5:
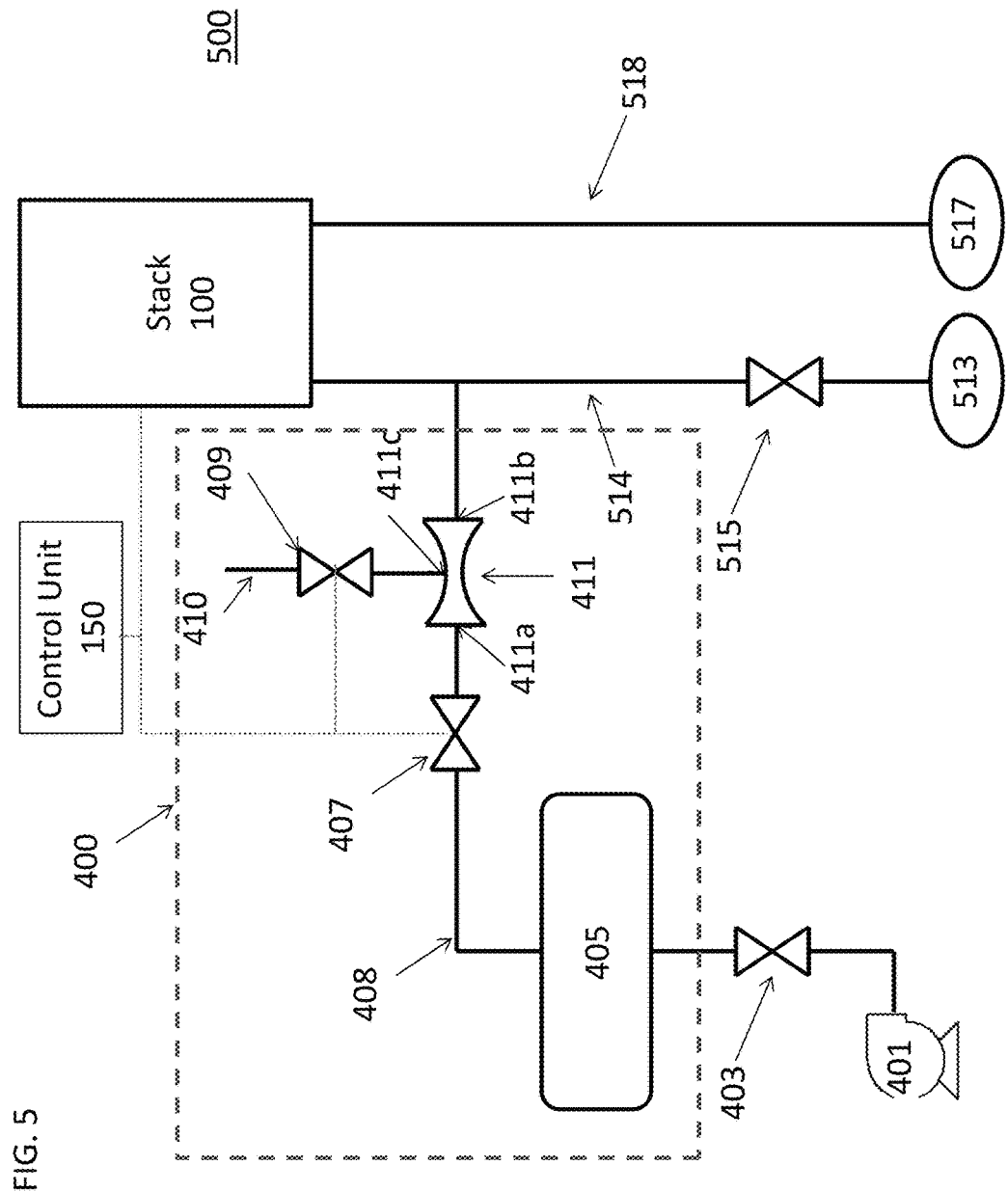
FIGS. 5, 6 and 7 are schematic diagrams of exemplary embodiment systems for intentionally oxidizing SOFC anodes at or near operating temperature.
Figure 6:
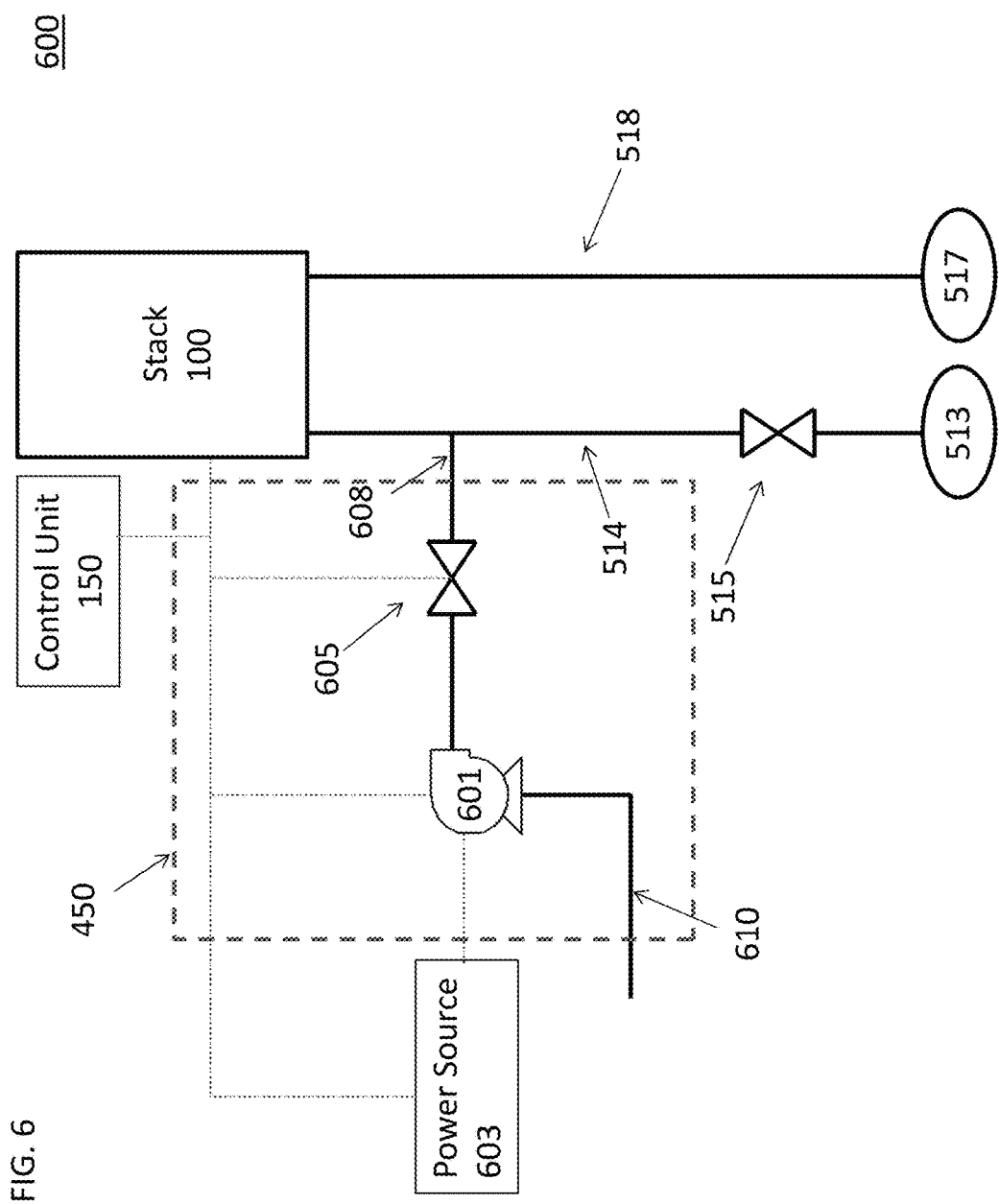
Figure 7:
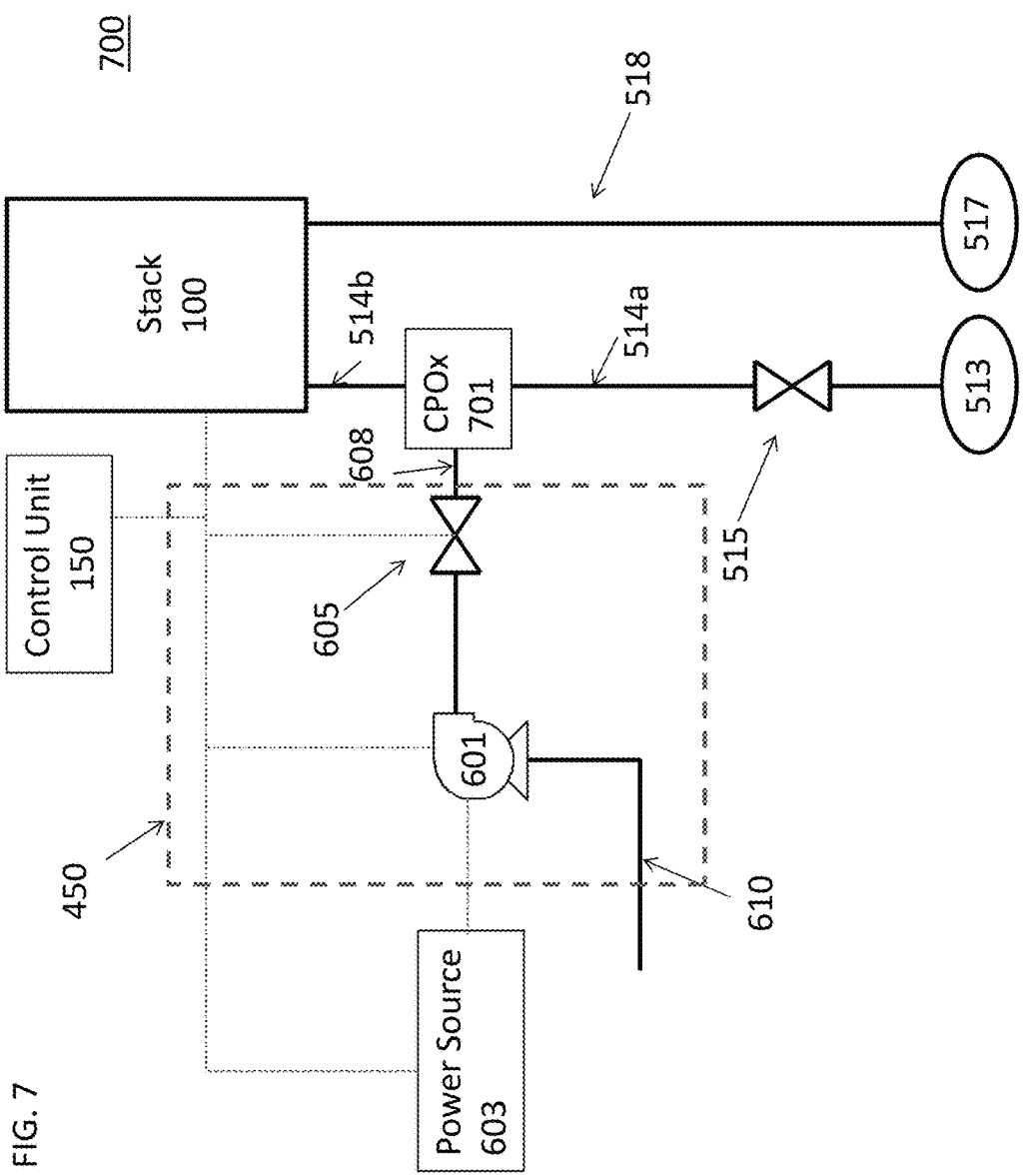

Any suitable component or sub-system ("oxidation unit") may be used to provide the intentional oxidation (e.g., air purge) of the SOFC anodes 103 of a SOFC system at or near the operating temperature of the SOFC stack 100. FIGS. 5, 6 and 7 illustrate three exemplary systems 500, 600 and 700 containing oxidation units 400, 450 (e.g., air purge subsystems). Preferably the air purge provides a higher air flow rate, pressure and volume than would be provided by simply exposing the anodes to the one atmosphere air ambient. Thus, in an embodiment, the oxidation unit includes one or more components, such as at least one of an air blower or pump, a pressurized air container, an eductor/venturi, etc., which can provide a higher flow rate, pressure and volume of air than just a valve which opens to provide outside atmospheric air through the stack fuel inlet or fuel outlet conduits to the anodes.

FIG. 5 is a schematic of an exemplary system 500 for intentional high temperature oxidation of the anodes 103 in the stack. The system 500 includes one or more SOFC stacks 100 (only one stack is shown for clarity) connected to a fuel inlet conduit (e.g., inlet pipe or line) 514 and a fuel exhaust conduit (e.g., inlet pipe or line) 518. The fuel inlet conduit 514 provides a fuel (e.g., hydrogen and/or hydrocarbon, such as natural gas) inlet stream from a fuel source 513 (e.g., a natural gas pipeline or a fuel tank) to the SOFC stack 100 and the fuel exhaust conduit 518 provides a fuel exhaust stream from the SOFC stack 100 to one or more balance of plant components 517, such as an anode tail gas oxidizer, one or more heat exchangers and/or other suitable components. The one or more balance of plant components 517 are described in more detail in U.S. Pat. No. 8,563,180 titled "SOFC hot box components" and issued on Oct. 22, 2013, which is incorporated herein by reference in its entirety.

A fuel inlet valve 515 may be located in the fuel inlet conduit 514. The valve may control the flow of fuel to the SOFC stack 100. Specifically, fuel may flow to the SOFC stack 100 via fuel inlet conduit 514 when the fuel inlet valve 515 is open and may cease flowing to the SOFC stack 100 when the fuel inlet valve 515 is closed.

In an embodiment, compressed air is intentionally provided to the SOFC stack 100 anodes by the oxidation unit 400 when the system 500 is stopped (e.g., during an emergency stop after the valve 515 is closed) while the SOFC stack 100 is relatively close to it operating temperature (e.g., at or above 760° C.) to prevent the SOFC anodes from undergoing oxidation at a relatively low temperature as a result of an emergency stop. In the system 500 of FIG. 5, compressed air may be stored in compressed air storage vessel 405, such as a compressed air tank.

In an embodiment, an optional air compressor 401 is fluidly connected to the vessel 405 to provide additional compressed air into the vessel 405 after some or all compressed air is released from the vessel. An air compressor valve 403 is located between the compressor 401 and the vessel 405. When the valve 403 is closed it separates the vessel from the compressor and when the valve is open it permits air to flow from the compressor 401 into the vessel 405.

Compressed air flow from the vessel 405 to the fuel inlet conduit 514 through the air inlet conduit 408 may be controlled by a compressed air valve 407. When the compressed air valve 407 is open, compressed air may flow from the vessel 405 to the fuel inlet conduit 514. When the compressed air valve 407 is closed, the vessel 405 and the fuel inlet conduit 514 may be pneumatically isolated (i.e., no air flows through conduit 408). Thus, during an emergency stop, compressed air valve 407 may be intentionally opened to allow the high temperature anode oxidation. Alternatively, the vessel 405 may be connected to the fuel outlet conduit 518 via conduit 408 instead of or in addition to being connected to the fuel inlet conduit 514.

In one embodiment, the compressed air valve 407 may be a "normally on" electronically actuated valve. Thus, valve 407 is actuated by an electrical signal. For example, when the valve 407 receives the electrical signal, then the valve is in a closed position. When the electrical signal is interrupted, the valve reverts to its normal open state. For example, valve 407 may be electrically connected to at least one of the electrical output of the stack 100 and/or the system controller (e.g., control unit 150), as shown by the dashed lines in FIG. 5.

When the stack is operating to generate electricity, then the stack 100 or the control unit 150 may provide an electrical signal to the valve 407 to keep it closed. If the stack stops generating electricity or if the stack is disconnected (e.g., by opening an electrical switch or relay) from the electrical load by the control unit 150 in case of a stop of the system 500, then the electrical signal to the valve 407 is terminated and the valve 407 automatically opens to allow the compressed air to flow from vessel 405 into the stack through conduits 408 and 514.

If the electrical signal to the valve 407 is provided directly from the stack 100, then the valve opening may be delayed after the stop because the stack 100 may still generate a sufficient open circuit voltage due to the remaining fuel and air in the stack passages even after the system stop. In contrast, if the electrical signal to the valve 407 is provided from the control unit 150, then the valve may open as soon as the control unit 150 determines that the system is stopped, such as when the stack is disconnected (e.g., by opening an electrical switch or relay) from the electrical load by the control unit 150.

In an optional embodiment of the system 500, an eductor 411 is located such that the compressed air flows through the eductor before reaching the stack 100. The eductor 411 may be located in the air inlet conduit 408 or in the fuel inlet or outlet conduits 514, 518. As shown in FIG. 5, the eductor 411 is preferably located in the air inlet conduit 408 between the compressed air valve 407 and the fuel inlet conduit 514. The eductor 411 may be any eductor known in the art, for example a Venturi eductor, having a narrow throat between wider motive inlet and discharge outlet. As an example, the eductor 411 may be made from a ceramic, such as alumina, or high temperature metal alloy, such as Inconel 600. The portion of conduit 408 extending to the vessel 405 is connected to the motive inlet 411a of the eductor 411, while another portion of conduit 408 extending to the fuel inlet conduit 514 is connected to the discharge outlet 411b of the eductor 411. An atmospheric air inlet conduit 410 may be connected to the suction inlet 411c in the throat of the eductor 411. Conduit 410 contains an inlet open to atmospheric air and an eductor valve 409.

The eductor valve 409 may control inlet of atmospheric air flow into the suction inlet of the eductor 411. The eductor 411 may amplify air flow when inlet air can flow through eductor valve 409 (i.e., when the eductor valve 409 is open). Meanwhile, the eductor 411 may not amplify air flow when the eductor valve 409 is closed, thereby preventing inlet air from entering the eductor through conduit 410.

When the anodes of SOFC stack 100 are to be oxidized at high temperature, such as during the emergency stop, the compressed air valve 407 and the eductor valve 409 are intentionally opened to allow compressed air to flow through the conduit 408 from vessel 405 into conduit 514. The flow of the compressed air from the motive inlet 411a through the throat of the eductor into the outlet 411b, creates a suction in the throat which draws in additional atmospheric air through conduit 410 into the suction inlet 411c of the eductor. The atmospheric air is combined with the compressed air in the eductor and the combined air flows are provided through conduits 408 and 514 into the stack 100.

In one embodiment, the eductor valve 409 may be a "normally on" electronically actuated valve. Thus, valve 409 is actuated by an electrical signal. For example, when the valve 409 receives the electrical signal, then the valve is in a closed position. When the electrical signal is interrupted, the valve reverts to its normal open state. For example, both valve 407 and valve 409 may be electrically connected to at least one of the electrical output of the stack 100 and/or the system controller (e.g., control unit 150), as shown by the dashed lines in FIG. 5. When the stack is operating to generate electricity, then the stack 100 or the control unit 150 may provide an electrical signal to the valves 407 and 409 to keep them closed. If the stack stops generating electricity or if the stack is disconnected (e.g., by opening an electrical switch or relay) from the electrical load by the control unit 150 in case of a stop of the system 500, then the electrical signals to the valves 407, 409 are terminated and the valves 407, 409 automatically open to allow the compressed air to flow from vessel 405 into the stack 100 through eductor 411 and conduits 408 and 514 and to allow atmospheric air to flow into the stack 100 from conduit 410 through eductor 411 and conduits 408 and 514.

FIG. 6 illustrates a SOFC system 600 according to an alternative embodiment. Instead of the oxidation unit 400 containing the compressed air storage vessel 405 of system 500, the system 600 includes an oxidation unit 450 containing an air blower or air pump 601. The blower or pump 601 provides atmospheric air from an inlet of an atmospheric air inlet conduit 610 through air inlet conduit 608 into fuel plumbing (e.g., fuel inlet or outlet conduits 514, 518) of the stack 100 during an operational stoppage. An electrical power source 603, such as a battery, supercapacitor bank, generator, power grid connection, etc., is electrically connected to the blower or pump 601. When the fuel cell system 600 stops generating electricity (e.g., during an emergency stop), the blower or pump 601 is turned on using the power from the power source 603 and the air valve 605 in conduit 608 is opened to provide air to the anodes of the stack 100 at high temperature.

The air valve 605 may be a "normally on" electronically actuated valve. Thus, valve 605 is actuated by an electrical signal. For example, when the valve 605 receives the electrical signal, then the valve is in a closed position. When the electrical signal is interrupted, the valve reverts to its normal open state.

For example, valve 605 may be electrically connected to at least one of the electrical output of the stack 100 and/or the system controller (e.g., control unit 150), as shown by the dashed lines in FIG. 6. When the stack is operating to generate electricity, then the stack 100 or the control unit 150 may provide an electrical signal to the valve 605 to keep it closed.

If the stack stops generating electricity or if the stack is disconnected (e.g., by opening an electrical switch or relay) from the electrical load by the control unit 150 in case of a stop of the system 600, then the electrical signal to the valve 605 is terminated and the valve 605 automatically opens to allow the air to be blown or pumped from blower or pump 601 into the stack 100 through conduits 608 and 514.

The power source 603 and/or the blower/pump 601 may also be connected to the electrical output of the stack 100 and/or the control unit 150. When the stack is operating to generate electricity, then the stack and/or the control unit provides an electrical signal to at least one of the power source 603, the blower/pump 601 to keep the blower/pump in the off state (e.g., powered down or turned off). If the stack stops generating electricity in case of a stop of the system 600, then the electrical signal to the at least one of the power source 603, the blower/pump 601 or a system controller is terminated and the blower/pump 601 is turned on. The blower/pump 601 may be turned on by turning on the power source 603 to provide power to the blower/pump 601 and/or by activating the operation of the blower/pump 601 using a control command from the system controller or by using internal logic in the blower/pump 601. If desired, the system 600 may also optionally include the eductor 411 located in conduit 608 and in contact with conduit 410, as described above.

FIG. 7 illustrates a SOFC system 700 according to an alternative embodiment. The system 700 is the same as system 600, except that the blower/pump 601 comprises a CPOx air blower or pump which provides air to a catalytic partial oxidation ("CPOx") reactor 701. The CPOx reactor is a fuel oxidation catalyst containing chamber which may be located at the intersection of the fuel inlet conduit having portions 514a and 514b and the CPOx air inlet conduit 608.

During system start up, air and fuel are provided into the CPOx reactor through the CPOx air inlet conduit 608 and the fuel inlet conduit portion 514a, respectively, to catalytically partially oxidize the fuel inlet stream. During steady state system operation, the air flow is turned off by turning off the CPOx air blower/pump 601 and/or by closing the air valve 605 such that the CPOx reactor 701 acts as a fuel passageway for the fuel inlet stream in which the fuel is not partially oxidized between conduit portions 514a, 514b.

In case of the stoppage of the system 700, the CPOx air blower/pump 601 is activated and the air valve 605 is opened, while the fuel valve 515 in the fuel inlet conduit portion 514a is closed by the system controller 150 or by automatic valve action to provide air but not fuel to the stack 100 anodes at high temperature. The system 700 thus does not require a separate dedicated anode oxidation blower/pump, and instead utilizes the existing CPOx air blower/pump to oxidize the anodes of the stack during shut down.

The method of operating system 700 includes providing an air inlet stream by at least one of the air blower or the air pump 601 into the CPOx reactor 701 through conduit 608 during operation start-up of the SOFC system 700, providing the fuel inlet stream into the CPOx reactor 701 through conduit portion 514a during the operation start-up of the SOFC system 700, and providing an oxidized fuel inlet stream from the CPOx reactor 701 into the SOFC stack 100 through conduit portion 514b during the operation start-up of the SOFC system. The air purge is provided by at least one of the air blower and the air pump 601 through the CPOx reactor 701 while the fuel inlet stream is not provided through the CPOx reactor 701 (e.g., by closing the valve 515) in response to the stop, such as a pre-planned or an emergency stop of the SOFC system.

The control unit 150 may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative modules (e.g., control unit 150) and algorithm steps described in connection with the embodiments disclosed herein may be implemented as electronic hardware, computer software, or combinations of both. To clearly illustrate this interchangeability of hardware and software, various illustrative components, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative modules (e.g., control unit 150) described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of operating a solid oxide fuel cell (SOFC) system comprising a plurality of SOFCs having cermet anode electrodes, comprising:

operating the SOFC system above 760° C. to generate electricity; and intentionally oxidizing the cermet anode electrodes at a temperature of at least 760° C. when the SOFC system stops operating to generate electricity, wherein:

the plurality of SOFCs are located in a SOFC stack; and the step of intentionally oxidizing the cermet anode electrodes comprises providing an air purge;

the air purge is provided in response to an emergency stop of the SOFC system; and the air purge is provided if a measured temperature of the SOFC stack is equal to or greater than 760° C. after the emergency stop of the SOFC system, and the SOFC system operation is not restarted.

2. The method of claim 1, wherein intentionally oxidizing the cermet anode electrodes comprises converting a metallic phase of the cermet into a metal oxide phase.

3. The method of claim 2, wherein:

the cermet anode electrodes comprise a nickel containing metallic phase and at least one of a doped ceria and a stabilized zirconia ceramic phase; and converting the metallic phase of the cermet into the metal oxide phase comprises converting the nickel into nickel oxide.

4. The method of claim 3, further comprising re-reducing the anode electrodes after the step of intentionally oxidizing the anode electrodes to convert the nickel oxide back into the nickel.

5. The method of claim 4, wherein the steps of intentionally oxidizing the cermet anode electrodes at a temperature above 760° C. and re-reducing the anode electrodes maintains a nickel electrically conductive percolation network in the cermet anodes.

6. The method of claim 1, wherein:

the plurality of SOFCs are located in a SOFC stack; and the step of intentionally oxidizing the cermet anode electrodes at a temperature above 760° C. comprises intentionally providing an oxidizing agent to the anode electrodes through at least one of a fuel inlet conduit or a fuel outlet conduit of the SOFC stack.

7. The method of claim 1, wherein the air purge is provided within five minutes of the emergency stop of the SOFC system while a SOFC stack temperature is at least 760° C.

8. The method of claim 1, wherein the air purge is provided while a SOFC stack temperature is 760 to 1100° C.

9. The method of claim 1, wherein the air purge is provided automatically in response to the emergency stop of the SOFC system.

10. The method of claim 1, wherein the air purge has at least one of a higher air flow rate, pressure or volume than a respective air flow rate, pressure or volume which can be provided by exposing the anode electrodes to 1 atmosphere pressure air ambient.

11. The method of claim 10, wherein the air purge is provided at a pressure above 1 atmosphere by at least one of an air blower, an air pump, a pressurized air storage vessel, or an eductor.

12. The method of claim 11, further comprising:

providing an air inlet stream by at least one of the air blower or the air pump into a CPOx reactor during operation start-up of the SOFC system;

providing a fuel inlet stream into the CPOx reactor during the operation start-up of the SOFC system; and providing an oxidized fuel inlet stream from the CPOx reactor into the SOFC stack during the operation start-up of the SOFC system;

wherein the air purge is provided by at least one of the air blower and the air pump through the CPOx reactor while the fuel inlet stream is not provided through the CPOx reactor in response to the emergency stop of the SOFC system.

13. A method of restoring electrical conductivity of a solid oxide fuel cell having a cermet anode electrode, comprising:

oxidizing the anode electrode at a temperature below 760° C. and reducing the anode electrode;

re-oxidizing the anode electrode at a temperature above 760° C. after reducing the anode electrode; and re-reducing the anode electrode after re-oxidizing the anode electrode;

wherein:

an electrical contact resistivity of the anode electrode after the step of reducing is lower than the electrical contact resistivity of the anode electrode prior to the step of oxidizing the anode electrode;

the electrical contact resistivity of the anode electrode after the step of re-reducing is higher than the electrical contact resistivity of the anode electrode after the step of reducing;

the steps of oxidizing and re-oxidizing the anode electrode comprise converting a metallic phase of the cermet into a metal oxide phase;

the cermet anode electrode comprises a nickel containing metallic phase and at least one of a doped ceria and a stabilized zirconia ceramic phase;

converting the metallic phase of the cermet into the metal oxide phase comprises converting the nickel into nickel oxide;

the steps of reducing and re-reducing convert the nickel oxide back into the nickel; the steps of oxidizing and reducing the cermet anode electrode disrupt a nickel electrically conductive percolation network in the cermet anode electrode; and the steps of re-oxidizing and re-reducing restore the nickel electrically conductive percolation network in the cermet anode electrode.

* * * * *